(12) United States Patent
Gotoh (10) Patent No.: US 9,041,371 B2
(45) Date of Patent: May 26, 2015

(54) SWITCHING REGULATOR (75) Inventor: Takashi Gotoh, Hyogo (JP)

(73) Assignee: RICOH COMPANY, LTD., Tokyo (JP)

( * ) Notice: Subject to any disclaimer, the term of this patent is extended or adjusted under 35 U.S.C. 154(b) by 221 days.

(21) Appl. No.: 13/635,371

(22) PCT Filed: Mar. 14, 2011

(86) PCT No.: PCT/JP2011/056508
§ 371 (c)(1),
(2), (4) Date: Oct. 10, 2012

(87) PCT Pub. No.: WO2011/115236
PCT Pub. Date: Sep. 22, 2011

(65) Prior Publication Data
US 2013/0038313 A1    Feb. 14, 2013

(30) Foreign Application Priority Data
Mar. 17, 2010    (JP) .................. 2010-061075

(51) Int. Cl.
*G05F 1/00*    (2006.01)
*H02M 1/32*    (2007.01)
*H02M 3/156*    (2006.01)

(52) U.S. Cl.
CPC .............. *H02M 1/32* (2013.01); *H02M 3/156* (2013.01)

(58) Field of Classification Search
USPC .......................... 323/222, 271, 282–285, 288
See application file for complete search history.

(56) References Cited

U.S. PATENT DOCUMENTS

| 6,028,755 | A | 2/2000 | Saeki et al. | |
|---|---|---|---|---|
| 6,366,066 | B1* | 4/2002 | Wilcox | 323/282 |
| 6,552,517 | B1* | 4/2003 | Ribellino et al. | 323/282 |
| 8,207,715 | B2 | 6/2012 | Gotoh | |
| 2005/0088159 | A1* | 4/2005 | Itohara | 323/284 |
| 2005/0258808 | A1* | 11/2005 | Chen et al. | 323/222 |
| 2008/0030181 | A1* | 2/2008 | Liu et al. | 323/283 |
| 2008/0036443 | A1 | 2/2008 | Kojima | |
| 2010/0066328 | A1* | 3/2010 | Shimizu et al. | 323/282 |

FOREIGN PATENT DOCUMENTS

| JP | H9-117131 | 5/1997 |
|---|---|---|
| JP | H11-220873 | 8/1999 |
| JP | 2004-70827 | 3/2004 |
| JP | 2006-43177 | 2/2008 |
| JP | 2009-253992 | 10/2009 |
| JP | 2010-146380 | 7/2010 |

OTHER PUBLICATIONS

2009253992, Switching power supply circuit, p. 1-9.*
International Search Report Issued May 17, 2011 in PCT/JP2011/056508 Filed on Mar. 14, 2011.

* cited by examiner

*Primary Examiner* — Nguyen Tran
(74) *Attorney, Agent, or Firm* — Cooper & Dunham LLP (57) ABSTRACT

A disclosed switching regulator includes a speed-up circuit for speeding up an operation of an error amplifier circuit during the time starting from when a switching element is turned OFF based on an output of an abnormality detection circuit, or starting from a fixed period of time after the switching element is turned OFF based on the output of the abnormality detection circuit, until the next time the switching element is again turned OFF based on an output of a PWM comparison circuit.

12 Claims, 8 Drawing Sheets

SWITCHING REGULATOR

TECHNICAL FIELD

The present invention is generally directed to a switching regulator, and in particular to a switching regulator that is required to detect an abnormal condition and then resume its function after recovery from the abnormal condition.

BACKGROUND ART

In general power circuits having a function of detecting an abnormal condition, an overshoot of the output voltage occurs after recovery from the abnormal condition. The overshoot of the output voltage occurs due to a response delay of the power circuit to load change or due to the efficiency limit of an error amplifier circuit used for amplifying a voltage difference between a voltage based on the output voltage and a reference voltage. However, the overshoot of the output voltage is particularly likely to occur along with an expansion of the difference between the input and output voltages and a decrease in the capacity of an output capacitor.

It is a common structure for power circuits having an overcurrent protection function as a function of detecting an abnormal condition to have an error amplifier circuit (or a comparison circuit) for detecting an overshoot of the output voltage in addition to an error amplifier circuit (or a comparison circuit) for stabilizing the output voltage (see Patent Document 1, for example).

However, it is difficult to create a minute voltage difference between a threshold of the error amplifier circuit (or the comparison circuit) for stabilizing the output voltage and a threshold of the error amplifier circuit (or the comparison circuit) for detecting an overshoot of the output voltage.

Accordingly, some conventional technologies have adopted a structure of reducing an overshoot of the output voltage by cutting off the electrical connection between an error amplifier and a phase compensation capacitor at the time of overcurrent detection and discharging an electric charge of the phase compensation capacitor (see Patent Document 2, for example), instead of reducing an overshoot of the output voltage by reducing a difference between the threshold of the circuit for stabilizing the output voltage and the threshold of the circuit for detecting an overshoot of the output voltage. With this structure, it is not required to improve the capacity of the error circuit the comparison circuit) used for stabilizing the output voltage more than necessary.

Patent Document 1: Japanese Laid-open Patent Application Publication No. H9-117131 (paragraphs [0101] to [0102]; FIGS 1 and 2, for example)

Patent Document 2: Japanese Laid-open Patent Application Publication No. 2009-253992 (FIGS. 1, 3, 4 and 7, for example)

With the structure as disclosed by Patent Document 2, it is required neither to provide the error amplifier circuit (or the comparison circuit) for detecting an overshoot of the output voltage nor to improve the capacity of the error amplifier circuit (or the comparison circuit) for stabilizing the output voltage more than necessary. However, in order to determine the timing for reconnecting the phase compensation capacitor, which has been electrically cut off from the error amplifier circuit, the structure still requires an output-voltage recovery detection circuit for detecting that the output voltage has recovered to a set voltage from being smaller than the set voltage.

In addition, even if the overcurrent detection takes a small amount of time, a large undershoot of the output voltage occurs at the time of the reconnection of the phase compensation capacitor to the error amplifier circuit due to a discharge of an electric charge of the phase compensation capacitor. Subsequently, an overcurrent is detected again at the time of recovery from the undershoot of the output voltage, which in turn results in instability of the output voltage.

DISCLOSURE OF THE INVENTION

Problems to be Solved by the Invention

In view of the above-described problems with the conventional technologies, embodiments of the present invention may provide a switching regulator capable of reducing the amount of output voltage overshoot occurring at the time of recovery from an abnormal condition, with a low cost configuration.

In addition, embodiments of the present invention may provide a switching regulator capable of reducing the amount of output voltage undershoot occurring at the time of reconnection of the phase compensation capacitor.

Means for Solving the Problem

According to one aspect of the present invention, there is provided a switching regulator including a switching element; an inductor; an output capacitor configured to smooth an output voltage; a reference voltage supply circuit configured to generate a reference voltage; an error amplifier circuit configured to amplify a voltage difference between a voltage based on the output voltage and the reference voltage; a phase compensation resistor electrically connected to an output of the error amplifier circuit; a phase compensation capacitor electrically connected to the output of the error amplifier circuit; an oscillation circuit; a slope voltage generating circuit configured to generate a voltage having temporal slopes; a PWM comparison circuit configured to compare the output of the error amplifier circuit and an output of the slope voltage generating circuit; an abnormality detection circuit configured to detect an abnormal condition of the switching element or an output load; a switching control circuit configured to turn the switching element ON based on an output of the oscillation circuit or an output of the PWM comparison circuit, and turn the switching element OFF based on the output of the PWM comparison circuit or an output of the abnormality detection circuit; and a speed-up circuit configured to speed up an operation of the error amplifier circuit during the time starting from when the switching element is turned OFF based on the output of the abnormality detection circuit, or starting from a fixed period of time after the switching element is turned OFF based on the output of the abnormality detection circuit, until the next time the switching element is again turned OFF based on the output of the PWM comparison circuit.

Advantageous Effect of the Invention

The switching regulator according to the embodiments of the present invention is capable of reducing the amount of output voltage overshoot occurring after recovery from an abnormal condition.

In addition, in the case when the speed-up circuit is provided with a function of electrically disconnecting and connecting the phase compensation capacitor from/to the error amplifier circuit and a function of charging and discharging the phase compensation capacitor, it is possible to reduce the amount of output voltage undershoot occurring at the time of reconnection of the phase compensation capacitor by limiting the speed of charging/discharging the phase compensation capacitor and also setting an upper limit voltage or a lower limit voltage for the charging/discharging operation.

Furthermore, in the case when the speed-up circuit is provided with the function of electrically disconnecting and connecting the phase compensation capacitor from/to the error amplifier circuit, it is possible to reduce transmission of noise of a signal used for switch control to the output of the error amplifier circuit by providing a switch between the phase compensation capacitor and the phase compensation resistor.

EXPLANATION OF LETTERS OR NUMERALS 1, 1a, 1b, 1c Switching regulator
2 Current detection circuit
3 Reference voltage supply circuit
4 Error amplifier circuit
5 Oscillation circuit
6 Slope voltage generating circuit
7 PWM comparison circuit
8 Overcurrent detection circuit
9 Switching control circuit
10, 10a, 10b, 10c, 10d Speed-up circuit
11, 15 Logical OR circuit
12, 16 Flip-flop circuit
13 Buffer
14 Logical AND circuit
17 Delay buffer
18 Inverter
20a, 20b, 20c Abnormality detection circuit

BEST MODE FOR CARRYING OUT THE INVENTION

Next are described preferred embodiments of the present invention with reference to the drawings. Note that in the drawings, identical reference numerals represent the same or equivalent components, and repeated explanation may be omitted.

First Embodiment

Figure 1:
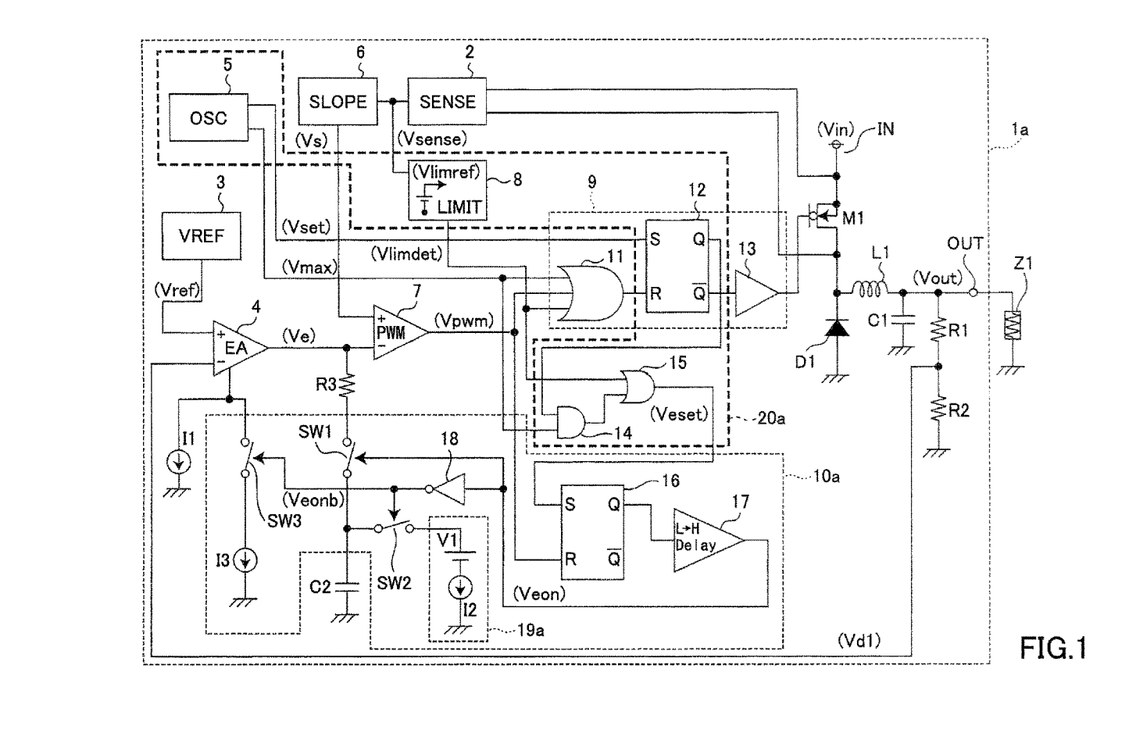
FIG. 1 is a circuit diagram of a switching regulator according to a first embodiment of the present invention.

FIG. 1 is a circuit diagram of a switching regulator 1a according to a first embodiment of the present invention. The switching regulator is of FIG. 1 converts an input voltage Vin input to en input terminal IN into a predetermined voltage, and outputs the converted voltage as an output voltage Vout from an output terminal OUT to a load Z1.

The switching regulator 1a includes a switching element M1 constituted by a PMOS transistor for controlling a current output from the input terminal IN; a rectifying diode D1; an inductor L1; an output capacitor C1; and output voltage detection resistors R1 and R2 for generating a divided voltage Vd1 by dividing the output voltage Vout from the output terminal OUT, and outputting the divided voltage Vd1.

The switching regulator 1a also includes a current detection circuit 2; a reference voltage supply circuit 3; an error amplifier circuit 4; an oscillation circuit 5; a slope voltage generating circuit 6; a PWM comparison circuit 7; an overcurrent detection circuit 8; a phase compensation resistor 63; a phase compensation capacitor C2; logical OR circuits 11 and 15; flip-flop circuits 12 and 16; a buffer 13; a logical AND circuit 14; a delay buffer 17; an inverter 18; bias currents (current supplies) I1, I2 and I3; switches SW1, SW2 and SW3; and a voltage supply V1.

Note that the logical OR circuit 11, the flip-flop circuit 12 and the buffer 13 make up a switching control circuit 9. The flip-flop circuit 16, the delay buffer 17, the inverter 18, the bias currents (current supplies) I2 and I3, the switches SW1, SW2 and SW3 and the voltage supply V1 make up a speed-up circuit 10a. In addition, the bias current (current supply) I2 and the voltage supply V1 make up a charge/discharge circuit 19a.

Figure 2:
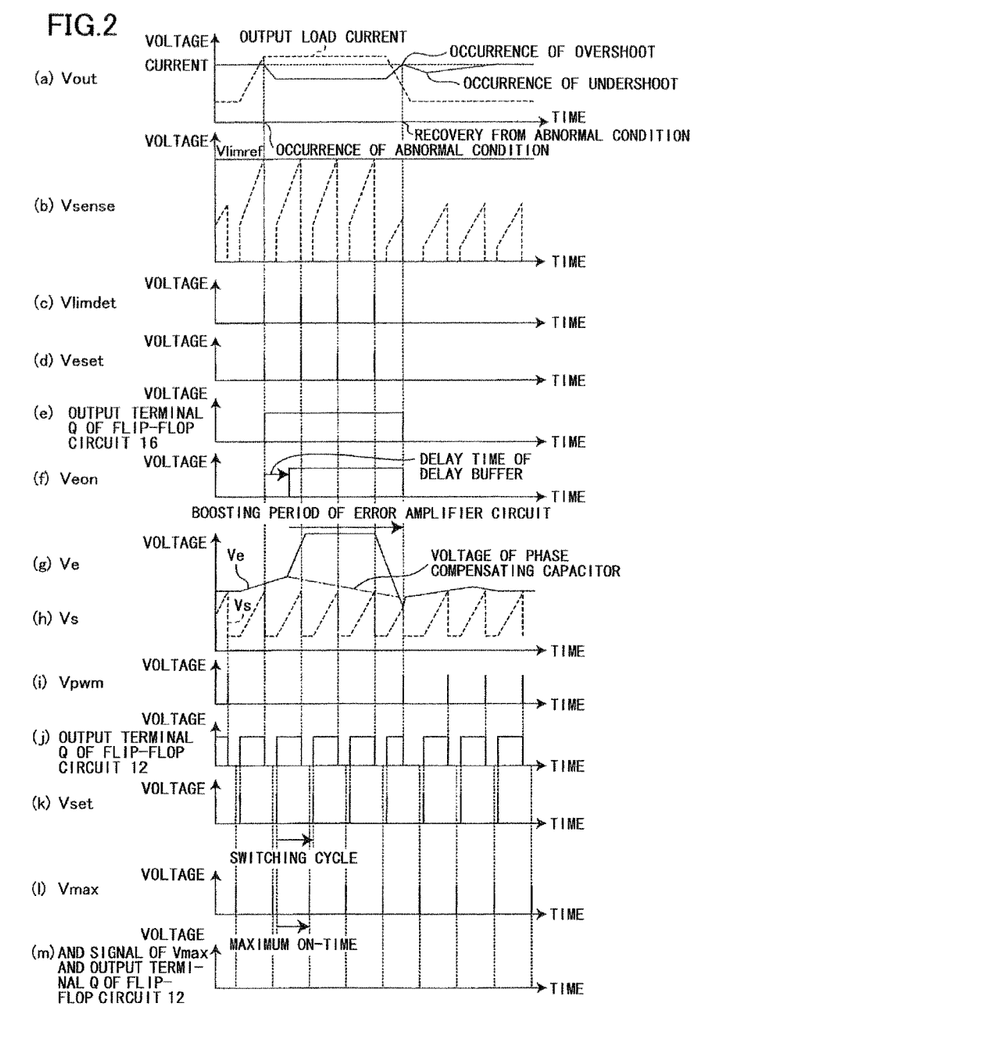
FIG. 2 is a first timing chart of the switching regulator according to the first embodiment of the present invention, showing changes of respective voltages and currents during the time immediately before occurrence of an abnormal condition up to immediately after recovery from the abnormal condition.

Next is described, with reference to a voltage waveform diagram of FIG. 2, a schematic operation of the switching regulator 1a according to the first embodiment, having the structure described above with reference to FIG. 1.

The current detection circuit 2 outputs a sense voltage Vsense corresponding to a current flowing through the switching element M1 while the switching element ON (see (b) in FIG. 2). The reference voltage supply circuit 3 generates and outputs a predetermined voltage Vref. When receiving the divided voltage Vd1 and the reference voltage Vref on its inverting input terminal and non-inverting input terminal, respectively, the error amplifier circuit 4 amplifies the difference between the two voltages and outputs an error voltage Ve ((g) in FIG. 2). The bias current I1 is input to a bias current input terminal of the error amplifier circuit 4. One terminal of the phase compensation resistor R3 is connected to the error voltage Ve, and one terminal of the phase compensation capacitor C2 is connected to ground.

The oscillation circuit 5 outputs a set pulse signal Vset ((k) in FIG. 2) which has narrow HIGH-level periods and defines the switching cycle and the on-timing of the switching element M1 and a maximum on-duty pulse signal Vmax ((l) in FIG. 2) which has narrow HIGH-level periods and is output at timing that limits the maximum on-time of the switching element M1. The slope voltage generating circuit 6 outputs a slope voltage Vs ((h) in FIG. 2) having temporal slopes corresponding to those of the sense voltage Vsense. When receiving the slope voltage Vs and the error voltage Ve on its non-inverting input terminal and inverting input terminal, respectively, the PWM comparison circuit 7 compares the two voltages and outputs a PWM comparison result Vpwm ((i) in FIG. 2).

The overcurrent detection circuit 8 generates an overcurrent threshold voltage Vlimref ((b) in FIG. 2), and outputs an overcurrent detection signal Vlimdet ((c) in FIG. 2) which becomes HIGH level when detecting that the sense voltage Vsense exceeds the overcurrent threshold voltage Vlimref. In the flip-flop circuit 12, the set pulse signal Vset is input to its set input terminal S and an OR result (i.e., an output from the logical OR circuit 11) is input to its reset input terminal R. The OR result is obtained in response to signals on input nodes of the logical OR circuit 11, i.e., the PWM comparison result Vpwm, the overcurrent detection signal Vlimdet and the maximum on-duty pulse signal Vmax. The buffer 13 causes switching of the switching element M1 according to an inverted output terminal Q-bar of the flip-flop circuit 12.

In the flip-flop circuit 16, a speed-up set signal Veset ((d) in FIG. 2) is input to its set input terminal S. The speed-up set signal Veset is an OR result (an output from the logical OR circuit 15) obtained in response to signals on input nodes of the logical OR circuit 15, i.e., the overcurrent detection signal Vlimdet and an AND result (an output from the logical AND circuit 14), which is obtained in response to signals on input nodes of the logical AND circuit 14, i.e., the maximum on-duty pulse signal Vmax and an output signal from an output terminal Q of the flip-flop circuit 12. The speed-up set signal Veset becomes High level when the flip-flop circuit 12 is reset by the maximum on-duty pulse signal Vmax or the overcurrent detection signal Vlimdet. In addition, in the flip-flop circuit 16, the PWM comparison result Vpwm is input to its reset input terminal R.

The delay buffer 17 is formed by adding, to a buffer, a function of causing a delay of a fixed time only to a transition from the LOW level to the HIGH level. An output terminal Q ((e) in FIG. 2) of the flip-flop circuit 16 is input to the delay buffer 17. To the inverter 18, an output of the delay buffer 17 is input.

Each of the switches SW1, SW2 and SW3 is configured to be turned ON when its input level is HIGH and turned OFF when its input level is LOW. The switch SW1 is connected to one end of the phase compensation resistor R3 and one end of the phase compensation capacitor C2. The switch SW2 is connected to one end of the phase compensation capacitor C2 and one end of the voltage supply V1. The switch SW3 is connected to the bias current input terminal of the error amplifier circuit 4 and one end of the bias current (current supply) I3. One end of the voltage supply V1 is connected to the bias current (current supply) I2. One end of each of the bias currents (current supplies) I1, I2 and I3 is connected to ground.

The speed-up circuit 10a according to the present embodiment cuts off the electrical connection between the error amplifier circuit 4 and the phase compensation capacitor C2 by turning OFF the switch SW1, and thereby speeds up the operation of the error amplifier circuit 4.

Also, by turning the switch SW2 ON while the switch SW1 is OFF, the speed-up circuit 10a discharges an electric charge of the phase compensation capacitor C2, which has been electrically cut off from the error amplifier circuit 4, while lowering the voltage of the voltage supply V1 to a lower limit voltage at a speed controlled by the bias current I2.

By turning the switch SW3 ON, the speed-up circuit 10a increases the bias current of the error amplifier circuit 4, and thereby speeds up the operation of the error amplifier circuit 4.

An output of the delay buffer 17 is a speed-up signal Veon ((f) in FIG. 2) and an output of the inverter 18 is an inverted speed-up signal Veonb. When the speed-up signal Veon is HIGH level, the inverted speed-up signal Veonb is LOW level and the switches SW1, SW2 and SW3 are controlled to be OFF, ON and ON, respectively.

Here, an input of HIGH level to the set input terminal S of the flip-flop circuit 16 indicates an occurrence of an abnormal condition. The output terminal Q of the flip-flop circuit 16 remaining at the HIGH level indicates continuation of the abnormal condition. An input of HIGH level to the reset input terminal R of the flip-flop circuit 16 during the abnormal condition indicates recovery from the abnormal condition. The output terminal Q of the flip-flop circuit 16 remaining at the LOW level indicates continuation of a normal condition.

In the switching regulator 1a according to the present embodiment, the oscillation circuit 5, the overcurrent detection circuit 8, the flip-flop circuit 12, the logical AND circuit 14 and the logical OR circuit 15 make up an abnormality detection circuit 20a.

The speed-up circuit 10a controls the switches SW1, SW2 and SW3 to be OFF, ON and ON, respectively, during the time starting from a fixed period of time, which is defined by the delay caused by the delay buffer 17, after occurrence of an abnormal condition until the next time the switching element M1 is again turned OFF based on an output of the PWM comparison circuit 7. Then, the speed-up circuit 1ea discharges the electric charge of the phase compensation capacitor C2 while lowering the voltage of the voltage supply V1 to the lower limit at a speed controlled by the bias current I2.

Adding the bias current I3 to the bias current input terminal of the error amplifier circuit 4 enables the operation of the error amplifier circuit 4 to be speeded up, and shortens the time between the recovery from the abnormal condition and the next time the switching element M1 is turned OFF based on an output of the PWM comparison circuit 7.

Furthermore, electrically cutting off the phase compensation capacitor C2 from the error amplifier circuit 4 enables the operation of the error amplifier circuit 4 to be speeded up, and reduces the amount of output voltage overshoot occurring at the time of recovery from the abnormal condition.

A reduction in the bias current I2 which causes the phase compensation capacitor C2 to discharge reduces the variation in the amount of electric charge of the phase compensation capacitor C2 during the period between the occurrence of an abnormal condition and the next time the switching element M1 is turned OFF based on an output of the PWM comparison circuit 7. Herewith, it is possible to reduce the amount of output voltage undershoot occurring at the time of reconnection of the phase compensation capacitor C2.

In addition, by having the voltage of the voltage supply V1, which is the lower limit voltage for causing the phase compensation capacitor C2 to discharge, exceed a lower limit voltage of the slope voltage Vs, it is possible to reduce the amount of output voltage undershoot occurring at the time of reconnection of the phase compensation capacitor C2 in the case when the phase compensation capacitor C2 is discharged to the lower limit voltage.

Figure 3:
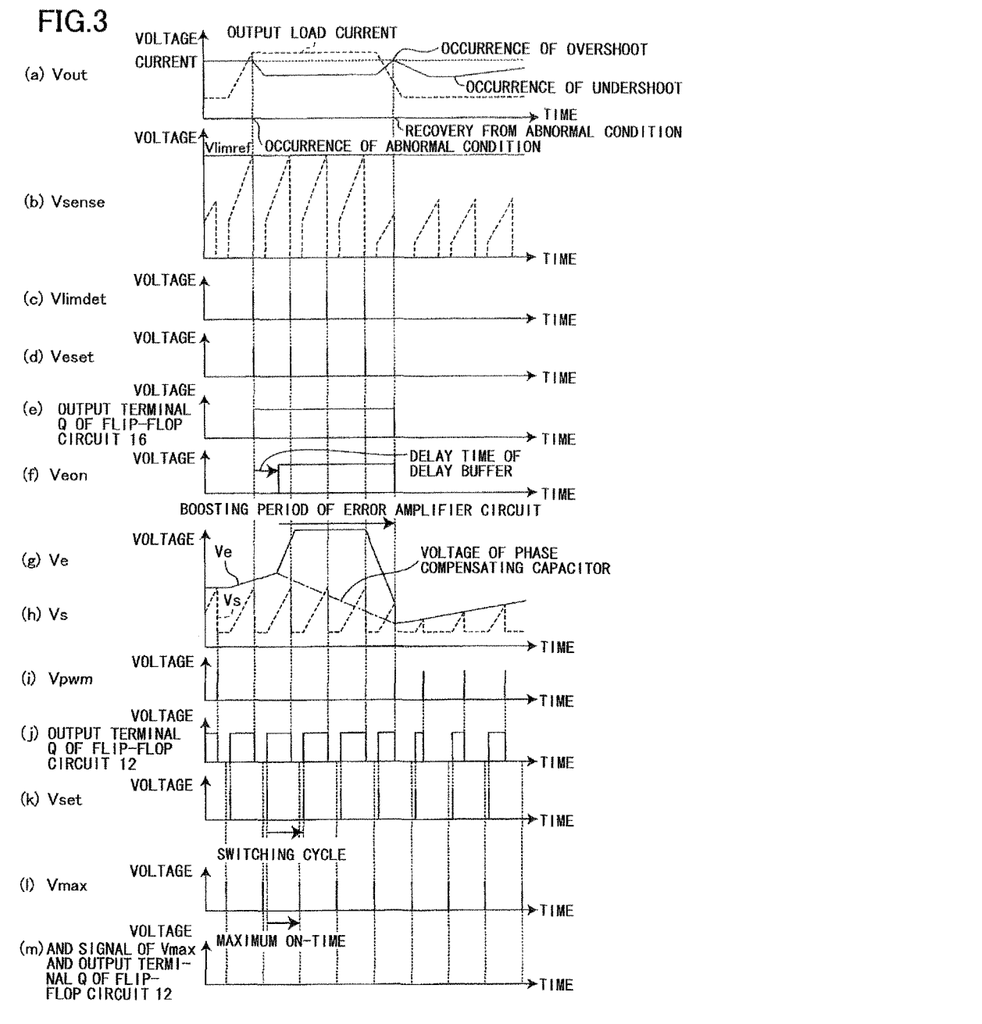
FIG. 3 is a second timing chart of the switching regulator according to the first embodiment of the present invention, showing changes of the respective voltages and currents during the time immediately before the occurrence of an abnormal condition up to immediately after the recovery from the abnormal condition.

As with FIG. 2, FIG. 3 is an example of a timing chart of the switching regulator 1a according to the first embodiment of the present invention, showing changes of the respective voltages and currents during the time immediately before occurrence of an abnormal condition up to immediately after recovery from the abnormal condition. FIG. 3 differs from FIG. 2 in that the bias current I2 which causes the phase compensation capacitor C2 to discharge is larger than that of the circuit shown in FIG. 2. Since the bias current I2 of the circuit of FIG. 3 is larger than that of the circuit of FIG. 2, the amplitude of the undershoot of the output voltage Vout is rather larger than that shown in FIG. 2 (see (a) in FIG. 2 and (a) in FIG. 3). In accordance with this change, the amplitudes of the changes in the error voltage Ve, the slope voltage Vs and the phase compensation capacitor voltage respectively become rather larger compared to those shown in FIG. 2 (see (g) and (h) in FIG. 2 and (g) and (h) in FIG. 3).

As has been described above, the following may be understood. That is, with the above-described procedure, the switching regulator 1a according to the present embodiment speeds up the operation of the error amplifier circuit 4 during the time starting from a fixed period of time after occurrence of an abnormal condition until the next time the switching element M1 is turned OFF based on an output of the PWM comparison circuit 7. Herewith, the time taken from recovery from the abnormal condition until the next time the switching element M1 is turned OFF based on an output of the PWM comparison circuit 7 is shortened, and the amplitude of output voltage overshoot occurring at the time of the recovery from the abnormal condition can be reduced.

It may also be understood that limiting the speed of discharging the electric charge accumulated in the phase compensation capacitor C2 and also setting the lower limit voltage for the discharge reduce the amplitude of the output voltage undershoot occurring after the recovery from the abnormal condition.

Second Embodiment

Figure 4:
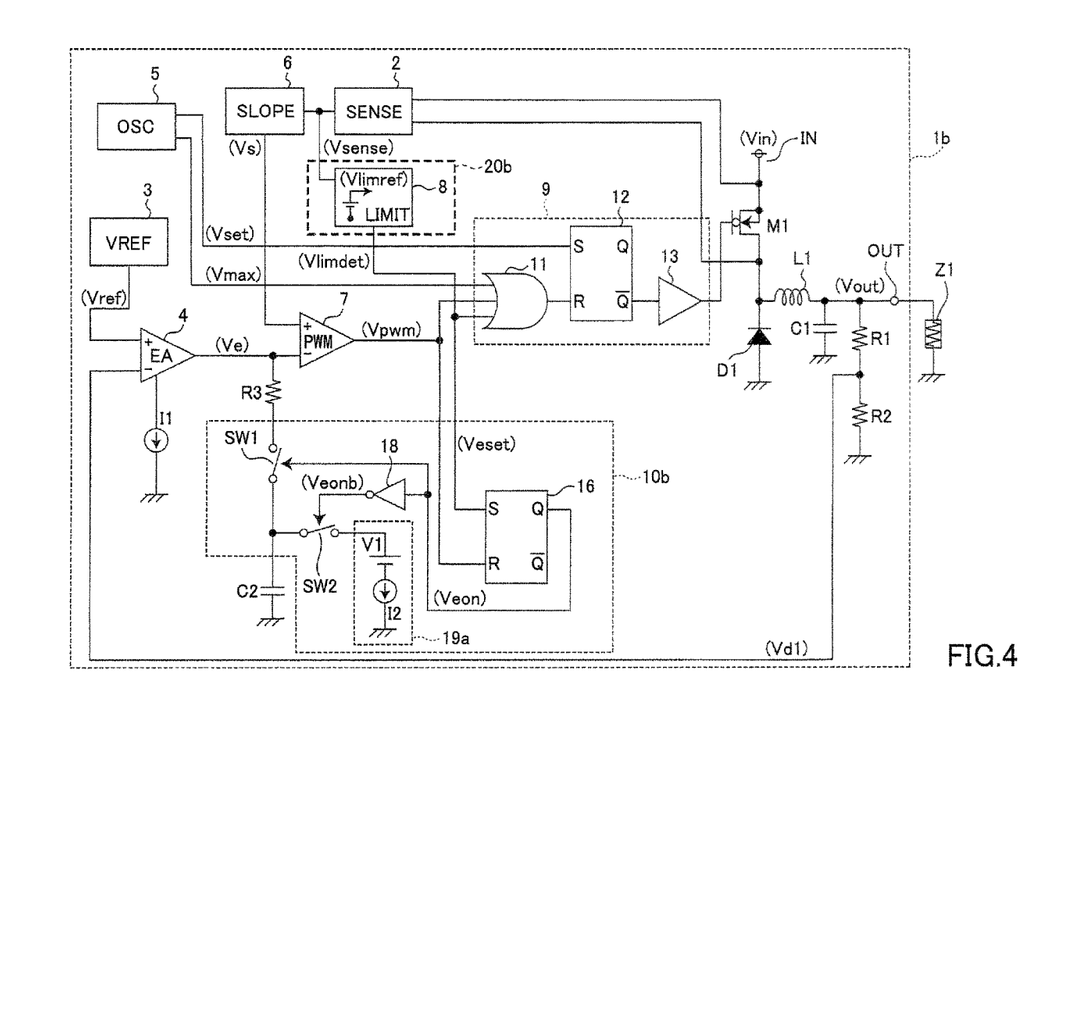
FIG. 4 is a circuit diagram of a switching regulator according to a second embodiment of the present invention.

FIG. 4 is a circuit diagram of a switching regulator according to a second embodiment of the present invention. In FIG. 4, components which are common or equivalent to those already described in connection with FIG. 1 are denoted by the same reference numerals. While omitting repeated explanations, the following description focuses on differences from FIG. 1.

A switching regulator 1b of FIG. 4 differs from the switching regulator 1a of FIG. 1 in a speed-up circuit 10b in place of the speed-up circuit 10a, and in not having the logical AND circuit 14 and the logical OR circuit 15.

The speed-up circuit 10b differs from the speed-up circuit 10a in not having the bias current (current supply) I3, the switch SW3 and the delay buffer 17.

Figure 5:
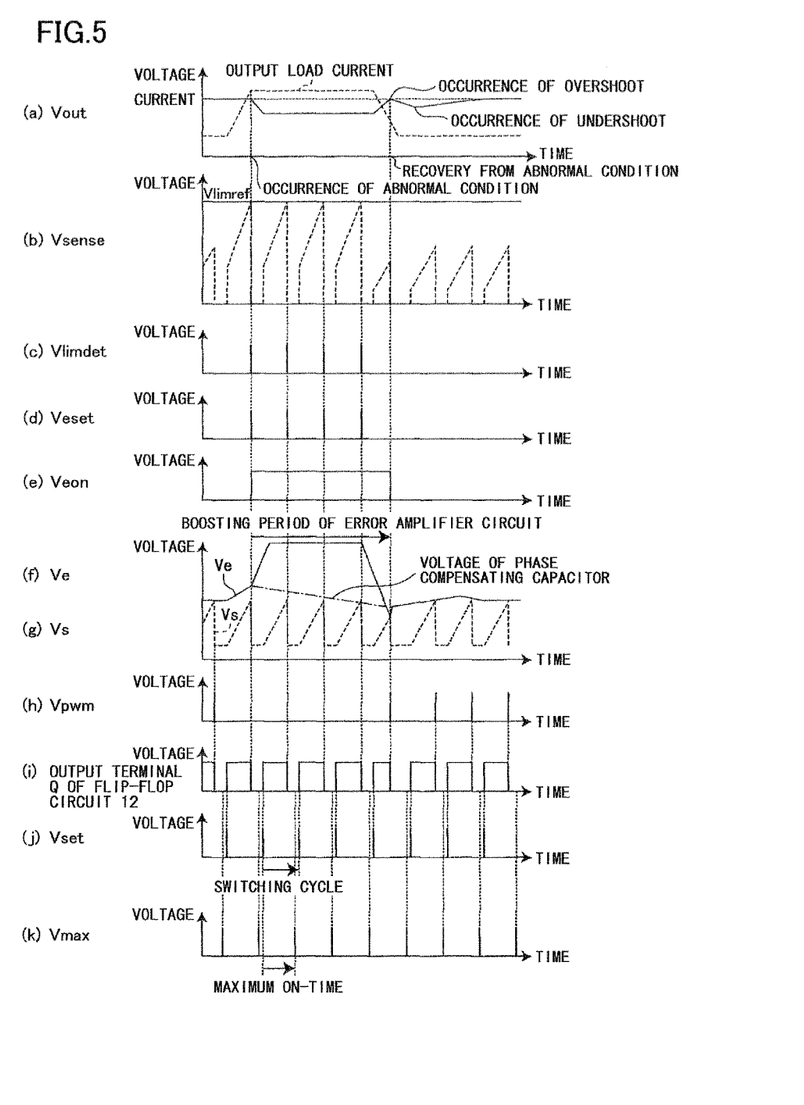
FIG. 5 is a timing chart of the switching regulator according to the second embodiment of the present invention, showing changes of respective voltages and currents from immediately before occurrence of an abnormal condition to immediately after recovery from the abnormal condition.

Next is described, with reference to a voltage waveform diagram of FIG. 5, a schematic operation of the switching regulator 1b according to the second embodiment, having the structure described above with reference to FIG. 4.

The current detection circuit 2 outputs the sense voltage Vsense corresponding to a current flowing through the switching element M1 while the switching element M1 is ON (see (b) in FIG. 5). The reference voltage supply circuit 3 generates and outputs the predetermined voltage Vref. When receiving the divided voltage Vd1 and the reference voltage Vref on its inverting input terminal and non-inverting input terminal, respectively, the error amplifier circuit 4 amplifies the difference between the two voltages and outputs the error voltage Ve ((f) in FIG. 5). The bias current I1 is input to the bias current input terminal of the error amplifier circuit 4. One terminal of the phase compensation resistor R3 is connected to the error voltage Ve, and one terminal of the phase compensation capacitor C2 is connected to ground.

The oscillation circuit outputs the set pulse signal Vset ((j) in FIG. 5) which has narrow HIGH-level periods and defines the switching cycle and the on-timing of the switching element M1 and the maximum on-duty pulse signal Vmax ((k) in FIG. 5) which has narrow HIGH-level periods and is output at timing that limits the maximum on-time of the switching element M1. The slope voltage generating circuit 6 outputs the slope voltage Vs ((g) in FIG. 5) having temporal slopes corresponding to those of the sense voltage Vsense. When receiving the slope voltage Vs and the error voltage Ve on its non-inverting input terminal and inverting input terminal, respectively, the PWM comparison circuit 7 compares the two voltages and outputs the PWM comparison result Vpwm ((h) in FIG. 5).

The overcurrent detection circuit 8 generates an overcurrent threshold voltage Vlimref ((b) in FIG. 5), and outputs the overcurrent detection signal Vlimdet ((c) in FIG. 5) which becomes HIGH level when detecting that the sense voltage Vsense exceeds the overcurrent threshold voltage Vlimref. In the flip-flop circuit 12, the set pulse signal Vset is input to its set input terminal S and an OR result (i.e., an output from the logical OR circuit 11) is input to its reset input terminal R. The OR result is obtained in response to signals on input nodes of the logical OR circuit 11, i.e., the PWM comparison result Vpwm, the overcurrent detection signal Vlimdet and the maximum on-duty pulse signal Vmax. The buffer 13 causes switching of the switching element M1 according to an inverted output terminal Q-bar of the flip-flop circuit 12.

In the flip-flop circuit 16, the overcurrent detection signal Vlimdet is input to its set input terminal S and the PWM comparison result Vpwm is input to its reset input terminal R. To the inverter 18, the output terminal Q of the flip-flop circuit 16 is input.

In the switching regulator 1b according to the present embodiment, the overcurrent detection signal Vlimdet ((c) in FIG. 5) corresponds to the speed-up set signal Veset ((d) in FIG. 5).

Each of the switches SW1 and SW2 is configured to be turned ON when its input level is HIGH and turned OFF when its input level is LOW. The switch SW1 is connected to one end of the phase compensation resistor R3 and one end of the phase compensation capacitor C2. The switch SW2 is connected to one end of the phase compensation capacitor C2 and one end of the voltage supply V1. One end of the voltage supply V1 is connected to the bias current (current supply) I2. One end of each of the bias currents (current supplies) I1 and I2 is connected to ground.

The speed-up circuit 10b according to the present embodiment cuts off the electrical connection between the error amplifier circuit 4 and the phase compensation capacitor C2 by turning OFF the switch SW1, and thereby speeds up the operation of the error amplifier circuit 4. Thus, the speed-up circuit 10b according to the present embodiment is also capable of speeding up the operation of the error amplifier circuit 4.

Also, by turning the switch SW2 ON while the switch SW1 is OFF, the speed-up circuit 10b discharges an electric charge of the phase compensation capacitor C2, which has been electrically cut off from the error amplifier circuit 4, while lowering the voltage of the voltage supply V1 to a lower limit voltage at a speed controlled by the bias current I2.

The output terminal Q of the flip-flop circuit 16 is the speed-up signal Veon ((e) in FIG. 5) and the output of the inverter 18 is the inverted speed-up signal Veonb. When the speed-up signal Veon is HIGH level, the inverted speed-up signal Veonb is LOW level and the switches SW1 and SW2 are controlled to be OFF and ON, respectively.

Here, an input of a HIGH level to the set input terminal S of the flip-flop circuit 16 indicates an occurrence of an abnormal condition. The output terminal Q of the flip-flop circuit 16 remaining at the HIGH level indicates continuation of the abnormal condition. An input of HIGH level to the reset input terminal R of the flip-flop circuit 16 during the abnormal condition indicates recovery from the abnormal condition. The output terminal Q of the flip-flop circuit 16 remaining at the LOW level indicates continuation of a normal condition.

In the switching regulator 1b according to the present embodiment, the overcurrent detection circuit 8 forms an abnormality detection circuit 20b.

The speed-up circuit 10b controls the switches SW1 and SW2 to be OFF and ON, respectively, during the time starting from occurrence of an abnormal condition until the next time the switching element M1 is again turned OFF based on an output of the PWM comparison circuit 7. Then, the speed-up circuit 10b discharges the electric charge of the phase compensation capacitor C2 while lowering the voltage of the voltage supply V1 to the lower limit at a speed controlled by the bias current I2.

Electrically cutting off the phase compensation capacitor C2 from the error amplifier circuit 4 enables the operation of the error amplifier circuit 4 to be speeded up, and reduces the amount of output voltage overshoot occurring at the time of recovery from the abnormal condition.

A reduction in the bias current I2 which causes the phase compensation capacitor C2 to discharge reduces the variation in the amount of electric charge of the phase compensation capacitor C2 during the period between the occurrence of an abnormal condition and the next time the switching element M1 is turned OFF based on an output of the PWM comparison circuit 7 after recovery from the abnormal condition. Herewith, it is possible to reduce the amount of output voltage undershoot occurring at the time of reconnection of the phase compensation capacitor C2.

In addition, by having the voltage of the voltage supply V1, which is the lower limit voltage for causing the phase compensation capacitor C2 to discharge, exceed the lower limit voltage of the slope voltage Vs, it is possible to reduce the amount of output voltage undershoot occurring at the time of reconnection of the phase compensation capacitor C2 in the case when the phase compensation capacitor C2 is discharged to the lower limit voltage.

As has been described above, the following may be understood. That is, with the above-described procedure, the switching regulator 1b according to the present embodiment speeds up the operation of the error amplifier circuit 4 during the time starting from occurrence of an abnormal condition until the next time the switching element M1 is turned OFF based on an output of the PWM comparison circuit 7. Herewith, the time taken from recovery from the abnormal condition until the next time the switching element M1 is turned OFF based on an output of the PWM comparison circuit 7 is shortened, and the amplitude of output voltage overshoot occurring at the time of the recovery from the abnormal condition can be reduced.

Third Embodiment

Figure 6:
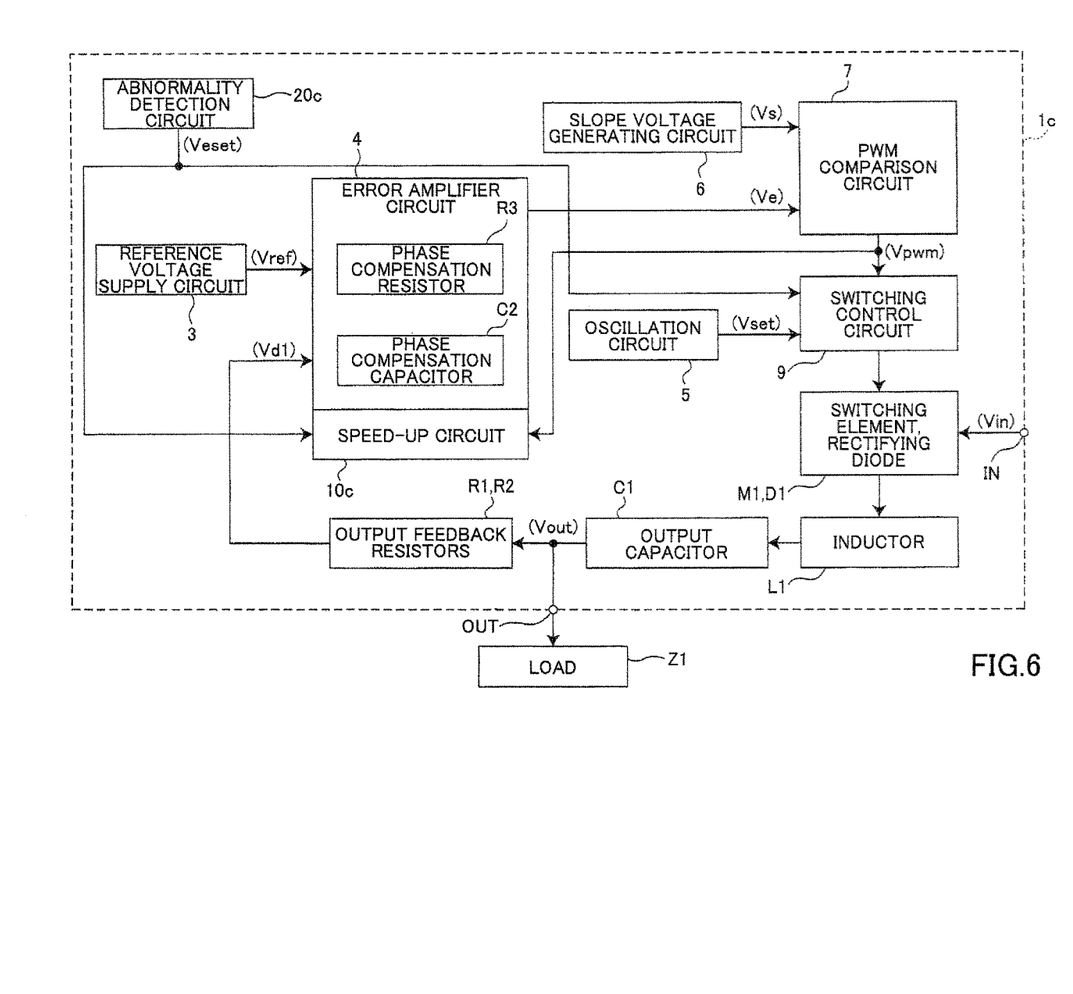
FIG. 6 is a block diagram showing a structural example of a switching regulator according to a third embodiment of the present invention.

FIG. 6 is a block diagram showing a structural example of a switching regulator 1c according to a third embodiment of the present invention. The structural example of FIG. 6 is formed by focusing on the functions of the components included in the circuit diagram of FIG. 1 according to the first embodiment and the circuit diagram of FIG. 4 according to the second embodiment and representing these components by blocks.

The switching regulator 1c of FIG. 6 includes the switching element M1; the rectifying diode D1; the inductor L1; the output capacitor C1; output feedback resistors R1 and R2; the reference voltage supply circuit 3; the error amplifier circuit 4; the oscillation circuit 5; the slope voltage generating circuit 6; the PWM comparison circuit 7; the switching control circuit 9; a speed-up circuit 10c; an abnormality detection circuit 20c; the phase compensation resistor R3; and the phase compensation capacitor C2. The switching regulator 1c corresponds to the switching regulator is of the circuit shown in FIG. 1 and the switching regulator 1b of the circuit shown in FIG. 4.

The abnormality detection circuit 20c outputs the speed-up set signal Veset which becomes HIGH level when detecting an abnormality. The abnormality detection circuit 20c corresponds to the abnormality detection circuit 20a included in the circuit of FIG. 1 and the abnormality detection circuit 20b included in the circuit of FIG. 4.

The speed-up circuit 10c speeds up the operation of the error amplifier circuit 4 during the time starting from when the speed-up set signal Veset becomes HIGH level after the abnormality detection circuit 20c detects an abnormality until the PWM comparison result Vpwm becomes HIGH level. The speed-up circuit 10c corresponds to the speed-up circuit 10a included in the circuit of FIG. 1 and the speed-up circuit 10b included in the circuit of FIG. 4. Thus, the action of the speed-up circuit 10c speeds up the operation of the error amplifier circuit 4, and thereby it is possible to shorten the time taken from the recovery from the abnormal condition until the PWM comparison result Vpwm becomes HIGH level.

As has been described above, the following may be understood. That is, with the above-described procedure, the switching regulator 1c according to the present embodiment speeds up the operation of the error amplifier circuit 4 during the time starting from occurrence of an abnormal condition until the next time the switching element M1 is turned OFF based on an output of the PWM comparison circuit 7. Herewith, the time taken from recovery from the abnormal condition until the next time the switching element M1 is turned OFF based on an output of the PWM comparison circuit 7 is shortened, and the amplitude of output voltage overshoot occurring at the time of recovery from the abnormal condition can be reduced.

Other Embodiments

Figure 7:
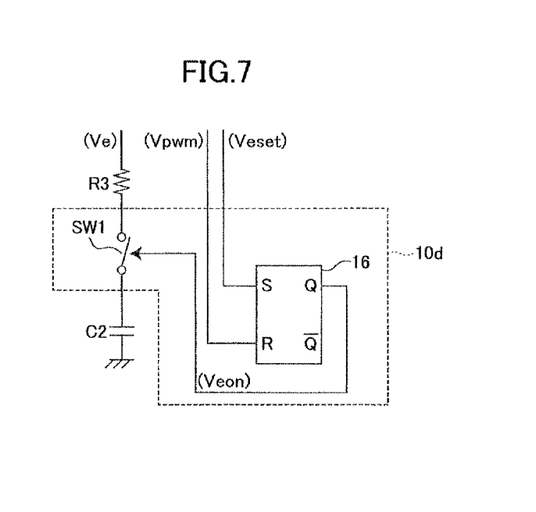
FIG. 7 shows a structural example of a speed-up circuit according to a modification of an embodiment of the present invention.

FIG. 7 shows a structure of a speed-up circuit 10d, the structure of which is different from that of the speed-up circuit 10b of the second embodiment, yet the speed-up circuit 10d can be used in place of the speed-up circuit 10b.

The speed-up circuit 10b of FIG. 4 includes the charge/discharge circuit 19a in order to prevent the voltage of the phase compensation capacitor C2 changing due to an electrical leak in the switch SW1 during the time when the switch SW1 is turned OFF to electrically cut off the phase compensation capacitor C2 from the error amplifier circuit 4 and, accordingly, the output voltage overshoots at the time of reconnection of the phase compensation capacitor C2.

In the case when the electrical leak in the switch SW1 can be ignored or a measurement against an electrical leak has been provided, no changes occur in the voltage of the phase compensation capacitor C2 due to the electrical leak in the switch SW1, and there is therefore no need to provide measures to prevent the output voltage from overshooting at the time of reconnection of the phase compensation capacitor C2. In this case, a charge/discharge circuit can be omitted, as in the case of the speed-up circuit 10d of FIG. 7.

Figure 8:
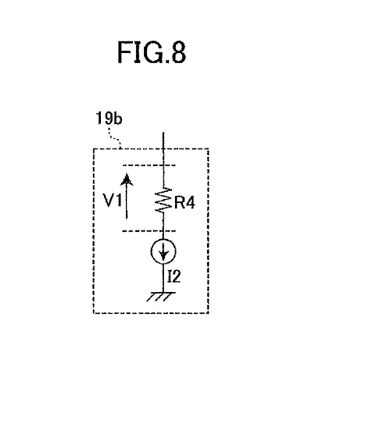
FIG. 8 shows a structural example of a discharge circuit according to a modification of an embodiment of the present invention.
Figure 9:
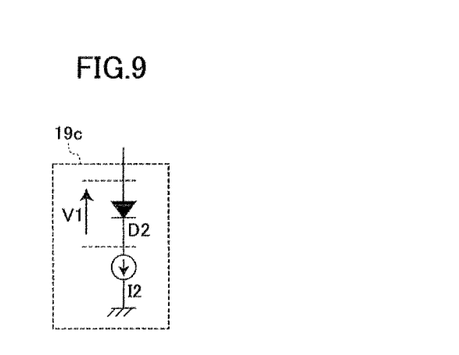
FIG. 9 shows a structural example of a discharge circuit cording to another modification of an embodiment of the present invention.
Figure 10:
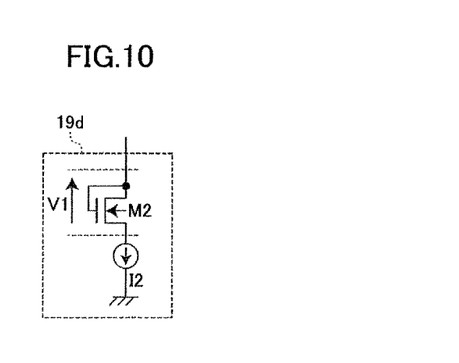
FIG. 10 shows a structural example of a discharge circuit according a yet another modification of an embodiment of the present invention.

FIGS. 8, 9 and 10 show structures of charge/discharge circuits 19b, 19c and 19d, respectively, each of which has a structure different from that of the charge/discharge circuit 19a and may be used in the embodiments of the present invention.

The voltage supply V1 only needs to be provided during the time when a current flows through the bias current (current supply) I2. Therefore, to make the circuit structure simple, the charge/discharge circuit 19b shown in FIG. 8 may be adopted which uses a voltage drop at a resistor R4 as the output voltage.

In addition, since the voltage supply V1 only needs to be provided during the time when a current flows through the bias current (current supply) I2, the charge/discharge circuit 19c shown in FIG. 9 may be adopted which uses a diode forward voltage of a diode D2 as the output voltage.

Furthermore, since the voltage supply V1 only needs to be provided during the time when a current flows through the bias current (current supply) I2, the charge/discharge circuit 19d shown in FIG. 10 may be adopted which uses a diode forward voltage of a MOS transistor M2 with a diode connection.

In the above description, an asynchronous rectification type step-down switching regulator is used as the power circuit; however, this is a mere example, and the present invention is not limited to this case. The present invention is also applicable to synchronous rectification type step-down switching regulators, step-up switching regulators, inverting switching regulators and the like. That is, the present invention is applicable to switching regulators that require detecting an abnormal condition and resuming their function after recovery from the abnormal condition.

The present application claims the benefit of its priority based on Japanese Patent Application No. 2010-061075 filed in the Japan Patent Office on Mar. 17, 2010, the entire contents of which are hereby incorporated herein by reference.

The invention claimed is:

1. A switching regulator comprising:
a switching element;
a reference voltage supply circuit configured to generate a reference voltage;
an error amplifier circuit configured to amplify a voltage difference between a voltage based on the output voltage and the reference voltage, the error amplifier circuit including a bias current input terminal;
a phase compensation resistor electrically connected to an output of the error amplifier circuit;
a phase compensation capacitor electrically connected to the output of the error amplifier circuit;
an oscillation circuit;
a slope voltage generating circuit configured to generate a voltage having temporal slopes;
a PWM comparison circuit configured to compare the output of the error amplifier circuit and an output of the slope voltage generating circuit;
an abnormality detection circuit configured to detect an abnormal condition of the switching element or an output load;
a switching control circuit configured to turn the switching element ON based on an output of the oscillation circuit or an output of the PWM comparison circuit, and turn the switching element OFF based on the output of the PWM comparison circuit or an output of the abnormality detection circuit; and
a speed-up circuit comprising a bias current supply connected to the bias current input terminal of the error amplifier circuit, to speed up an operation of the error amplifier circuit during a time starting from when the switching element is turned OFF based on the output of the abnormality detection circuit, or starting from a fixed period of time after the switching element is turned OFF based on the output of the abnormality detection circuit, until a next time the switching element is again turned OFF based on the output of the PWM comparison circuit,
wherein the speed-up circuit speeds up the operation of the error amplifier circuit by electrically disconnecting or connecting the phase compensation capacitor from/to the error amplifier circuit, and
wherein the speed-up circuit includes a charge/discharge circuit, and the speed-up circuit speeds up the operation of the error amplifier circuit by the charge/discharge circuit charging or discharging the phase compensation capacitor during a time when the phase compensation capacitor is electrically disconnected from the error amplifier circuit,
wherein a switch is disposed between the phase compensation capacitor and the phase compensation resistor, and thereby the phase compensation capacitor is electrically disconnected or connected from/to the error amplifier circuit.

2. A switching regulator comprising:
a switching element;
a reference voltage supply circuit configured to generate a reference voltage;
an error amplifier circuit configured to amplify a voltage difference between a voltage based on the output voltage and the reference voltage, the error amplifier circuit including a bias current input terminal;
a phase compensation resistor electrically connected to an output of the error amplifier circuit;
a phase compensation capacitor electrically connected to the output of the error amplifier circuit;
an oscillation circuit;
a slope voltage generating circuit configured to generate a voltage having temporal slopes;
a PWM comparison circuit configured to compare the output of the error amplifier circuit and an output of the slope voltage generating circuit;
an abnormality detection circuit configured to detect an abnormal condition of the switching element or an output load;
a switching control circuit configured to turn the switching element ON based on an output of the oscillation circuit or an output of the PWM comparison circuit, and turn the switching element OFF based on the output of the PWM comparison circuit or an output of the abnormality detection circuit; and
a speed-up circuit comprising a bias current supply connected to the bias current input terminal of the error amplifier circuit, to speed up an operation of the error amplifier circuit during a time starting from when the switching element is turned OFF based on the output of the abnormality detection circuit, or starting from a fixed period of time after the switching element is turned OFF based on the output of the abnormality detection circuit, until a next time the switching element is again turned OFF based on the output of the PWM comparison circuit, wherein the speed-up circuit speeds up the operation of the error amplifier circuit by electrically disconnecting or connecting the phase compensation capacitor from/to the error amplifier circuit, and wherein the speed-up circuit includes a charge/discharge circuit, and the speed-up circuit speeds up the operation of the error amplifier circuit by the charge/discharge circuit charging or discharging the phase compensation capacitor during a time when the phase compensation capacitor is electrically disconnected from the error amplifier circuit, wherein during the time when the phase compensation capacitor is electrically disconnected from the error amplifier circuit, the charge/discharge circuit discharges the phase compensation capacitor to a discharge lower limit voltage or charges the phase compensation capacitor to a charge upper limit voltage, and the discharge lower limit voltage is larger than a lower limit voltage of the output of the slope voltage generating circuit and the charge upper limit voltage is smaller than an upper voltage of the output of the slope voltage generating circuit.

3. The switching regulator as claimed in claim 2, wherein the abnormality detection circuit detects the abnormal condition when on-time of the switching element is limited to a maximum on-time.

4. The switching regulator as claimed in claim 2, wherein the speed-up circuit speeds up the operation of the error amplifier circuit by changing a bias current of the error amplifier circuit.

5. The switching regulator as claimed in claim 2, wherein the speed-up circuit speeds up the operation of the error amplifier circuit by electrically disconnecting or connecting the phase compensation capacitor from/to the error amplifier circuit.

6. The switching regulator as claimed in claim 1, wherein the charge/discharge circuit charges or discharges the phase compensation capacitor at a constant current during the time when the phase compensation capacitor is electrically disconnected from the error amplifier circuit.

7. The switching regulator as claimed in claim 2, wherein the abnormality detection circuit detects the abnormal condition when a current flowing through the switching element is an overcurrent.

8. The switching regulator as claimed in claim 1, wherein the abnormality detection circuit detects the abnormal condition when a current flowing through the switching element is an overcurrent.

9. The switching regulator as claimed in claim 1, wherein the abnormality detection circuit detects the abnormal condition when on-time of the switching element is limited to a maximum on-time.

10. The switching regulator as claimed in claim 1, wherein the speed-up circuit speeds up the operation of the error amplifier circuit by changing a bias current of the error amplifier circuit.

11. The switching regulator as claimed in claim 1, wherein the speed-up circuit speeds up the operation of the error amplifier circuit by electrically disconnecting or connecting the phase compensation capacitor from/to the error amplifier circuit.

12. The switching regulator as claimed in claim 2, wherein the charge/discharge circuit charges or discharges the phase compensation capacitor at a constant current during the time when the phase compensation capacitor is electrically disconnected from the error amplifier circuit.

* * * * *